US011966637B1

(12) United States Patent
Bonwick (10) Patent No.: US 11,966,637 B1
(45) Date of Patent: Apr. 23, 2024

(54) METHOD AND SYSTEM FOR STORING DATA IN PORTABLE STORAGE DEVICES (71) Applicant: iodyne, LLC, Mill Valley, CA (US)

(72) Inventor: Jeffrey S. Bonwick, Los Altos, CA (US)

(73) Assignee: iodyne, LLC, Mill Valley, CA (US)

(*) Notice: Subject to any disclaimer, the term of this patent is extended or adjusted under 35 U.S.C. 154(b) by 97 days.

(21) Appl. No.: 17/961,732

(22) Filed: Oct. 7, 2022

Related U.S. Application Data (63) Continuation of application No. 17/067,932, filed on Oct. 12, 2020, now Pat. No. 11,467,777.

(51) Int. Cl.
*G06F 3/06* (2006.01)
*G06F 11/10* (2006.01)

(52) U.S. Cl.
CPC .......... *G06F 3/0665* (2013.01); *G06F 3/0619* (2013.01); *G06F 3/0631* (2013.01); *G06F 3/064* (2013.01); *G06F 3/0689* (2013.01); *G06F 11/1076* (2013.01)

(58) Field of Classification Search
CPC .... G06F 3/0665; G06F 3/0619; G06F 3/0631; G06F 3/064; G06F 3/0689; G06F 11/1076
See application file for complete search history.

(56) References Cited

U.S. PATENT DOCUMENTS

| | | | |
|---|---|---|---|
| 5,305,389 A | 4/1994 | Palmer | |
| 5,774,643 A | 6/1998 | Lubbers et al. | |
| 6,161,192 A | 12/2000 | Lubbers et al. | |
| 7,809,888 B1 | 10/2010 | Clark et al. | |
| 8,046,551 B1* | 10/2011 | Sahin | G06F 12/0866 714/707 |
| 10,146,694 B1 | 12/2018 | Laier et al. | |
| 2005/0172082 A1 | 8/2005 | Liu et al. | |
| 2007/0186065 A1* | 8/2007 | Lee | G06F 3/0674 711/159 |
| 2010/0042775 A1* | 2/2010 | Yeh | G06F 12/0246 711/118 |
| 2014/0129779 A1 | 5/2014 | Frachtenberg et al. | |
| 2018/0088805 A1* | 3/2018 | Kanno | G06F 3/065 |
| 2021/0263674 A1* | 8/2021 | Shin | G11C 11/5628 |

OTHER PUBLICATIONS

Mishra, Sanjeeb et al., "Volatile Memory: Generic 300 Architecture Components: System on Chip Interfaces for Low Power Design", ScienceDirect, 2016, p. 1 of 9 and p. 2 of 9.

* cited by examiner

*Primary Examiner* — Michael Krofcheck
(74) *Attorney, Agent, or Firm* — Smith & Woldesenbet Law Group, PLLC (57) ABSTRACT

A method and system for storing data in portable storage devices. Specifically, the disclosed method and system provide a solution for the write-hole problem inflicting persistent storage, especially redundant array of independent disks (RAID) configured storage. The write-hole problem may arise from the occurrence of power failure during a write operation of data to RAID configured storage, subsequently resulting in disparities between the data and parity information thereof—the consistency there-between of which is critical to data reconstruction upon disk failure. To rectify these inconsistencies, a full-stripe (or full-block set) write is recommended, which the disclosed method and system implements through the use of, and re-mapping of relationships between, virtual, physical, and in-memory block sets.

20 Claims, 11 Drawing Sheets

FIG. 7

METHOD AND SYSTEM FOR STORING DATA IN PORTABLE STORAGE DEVICES

CROSS REFERENCE TO RELATED APPLICATIONS

This application is a continuation application of and claims priority under 35 U.S.C. § 120 to U.S. patent application Ser. No. 17/067,932, titled "Method and System For Storing Data In Portable Storage Devices" and filed on Oct. 12, 2020 (projected to be U.S. Pat. No. 11,467,777 issued on Oct. 11, 2022), the entire contents of which are hereby incorporated herein by reference.

BACKGROUND

Fault-tolerance, improved write performance, and/or increased storage capacity may be provided through the varying levels of redundant array of independent disks (RAID) storage. Despite these and other advantages brought upon their implementation, RAID storage also harbors some shortfalls—one of which has been thoroughly documented as the RAID write-hole problem.

SUMMARY

In general, in one aspect, the invention relates to a method for writing data. The method includes receiving, associated with a namespace, a write request including write-data, selecting a first virtual block set associated with the namespace, identifying a second virtual block set paired to the first virtual block set, copying, into an in-memory block set, live data from a first physical block set mapped to the second virtual block set, storing the write-data across unallocated cells of the in-memory block set, writing the in-memory block set to a second physical block set mapped to the first virtual block set, and updating virtual block set and physical block set associations.

In general, in one aspect, the invention relates to a non-transitory computer readable medium (CRM). The non-transitory CRM includes computer readable program code, which when executed by a computer processor, enables the computer processor to receive, associated with a namespace, a write request including write-data, select a first virtual block set associated with the namespace, identify a second virtual block set paired to the first virtual block set, copy, into an in-memory block set, live data from a first physical block set mapped to the second virtual block set, store the write-data across unallocated cells of the in-memory block set, write the in-memory block set to a second physical block set mapped to the first virtual block set, and update virtual block set and physical block set associations.

In general, in one aspect, the invention relates to a portable storage device. The portable storage device includes volatile storage and persistent storage, and a controller operatively connected to the volatile storage and the persistent storage, and programmed to receive, associated with a namespace, a write request including write-data, select a first virtual block set associated with the namespace, identify a second virtual block set paired to the first virtual block set, copy, into an in-memory block set of the volatile storage, live data from a first physical block set of the persistent storage mapped to the second virtual block set, store the write-data across unallocated cells of the in-memory block set, write the in-memory block set to a second physical block set of the persistent storage mapped to the first virtual block set, and update virtual block set and physical block set associations.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for storing data in portable storage devices. Specifically, one or more embodiments of the invention provide a solution for the write-hole problem inflicting persistent storage, especially redundant array of independent disks (RAID) configured storage. The write-hole problem may arise from the occurrence of power failure during a write operation of data to RAID configured storage, subsequently resulting in disparities between the data and parity information thereof—the consistency there-between of which is critical to data reconstruction upon disk failure. To rectify these inconsistencies, a full-stripe (or full-block set) write is recommended, which the disclosed method and system implements through the use of, and re-mapping of relationships between, virtual, physical, and in-memory block sets.

Figure 1:
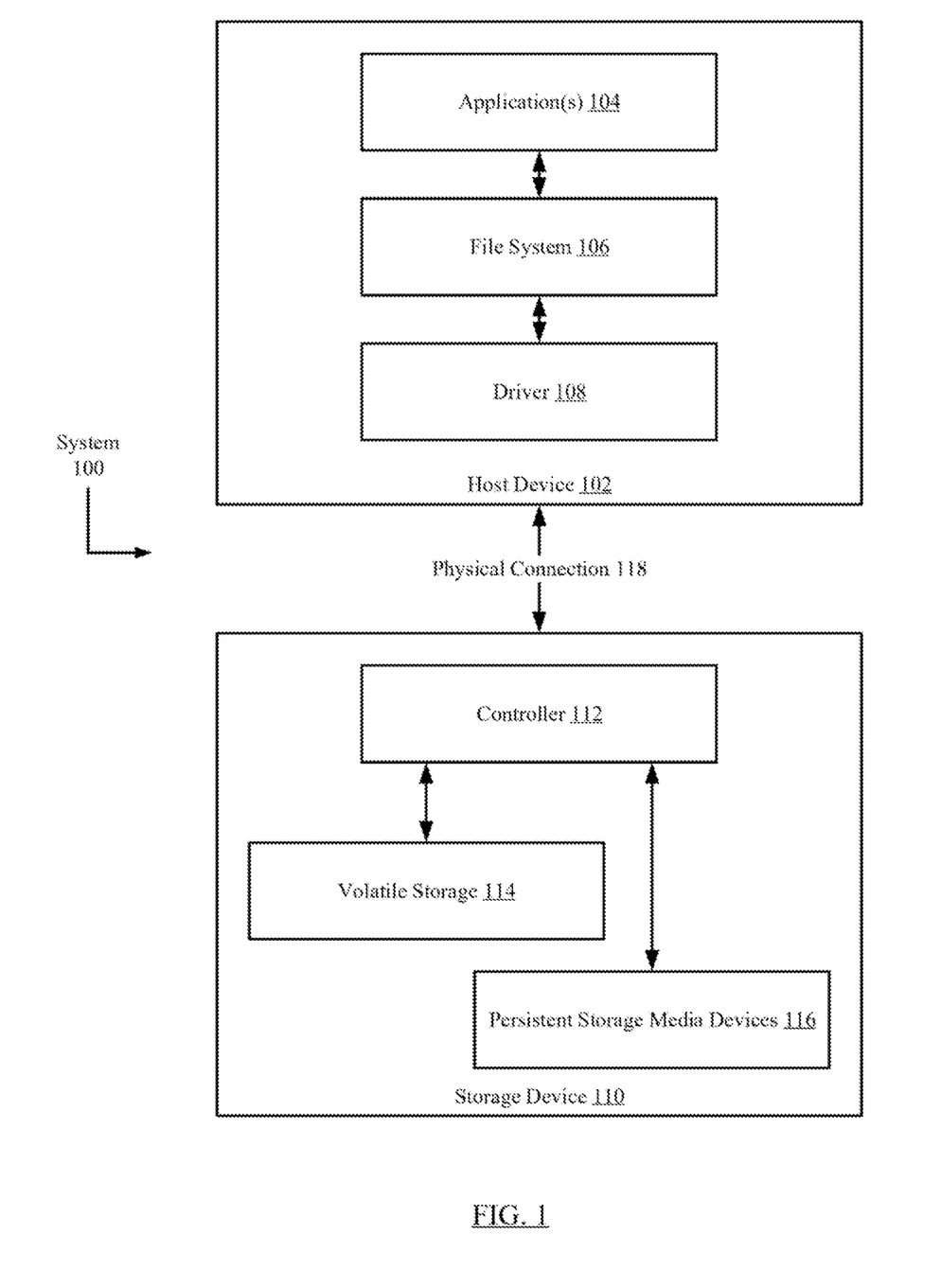
FIG. 1 shows a system in accordance with one or more embodiments of the invention.

FIG. 1 shows a system in accordance with one or more embodiments of the invention. The system (100) may include a host device (102) operatively connected to a storage device (110) through a physical connection (118). Each of these system (100) components is described below.

In one embodiment of the invention, the host device (102) may represent any physical appliance or computing system configured to receive, generate, process, store, and/or send data. Examples of the host device (102) may include, but are not limited to, a desktop computer, a tablet computer, a laptop computer, or any computing system similar to the exemplary computing system shown in FIG. 7. Furthermore, the host device (102) may include one or more applications (104), at least one file system (106), and at least one driver (108). Each of these host device (102) subcomponents is described below.

In one embodiment of the invention, an application (104) may refer to a computer program that may execute on the underlying hardware of the host device (102). Generally, an application (104) may be configured to perform one or more functions, tasks, and/or activities instantiated by a user of the host device (102). Further, towards performing these operations, an application (104) may include functionality to request and consume host device (102) resources (not shown) (e.g., computer processors, memory, storage, virtualization, network bandwidth, etc.) by way of service calls to the host device (102) operating system (OS) or kernel (not shown). An application (104) may also include functionality to request and consume resources, via service calls to the host device (102) OS or kernel, from external devices such as the storage device (110), which may operatively connect to the host device (102). One of ordinary skill will appreciate that an application (104) may perform other functionalities without departing from the scope of the invention. Examples of an application (104) may include, but are not limited to, a word processor, a multimedia creation program, a multimedia editing program an email client, a database client, a web browser, a file viewer, an image editor, a simulator, a computer game, or another computer executable program.

In one embodiment of the invention, an application (104) may utilize service calls to read and/or write information from/to persistent (i.e., non-volatile) storage on the host device (102) and/or the storage device (110). To enable these service calls, the host device (102) OS or kernel may implement and expose one or more file systems (106) to a user and, accordingly, to any application (104). Each file system (106) may represent one or more data objects or structures that collectively index and track various forms of a given subset of information stored on the host device (102) and/or the storage device (110). By way of an example, a file system (106) may be implemented through at least a directory and an mode table, which may map filenames to disk blocks or cells in the physical storage on which the binary data corresponding to the filenames may reside. The invention is not limited to the aforementioned example.

In one embodiment of the invention, a file system (106) may interact with one or more drivers (108) to retrieve and/or store data from/into persistent storage on the host device (102) and/or the storage device (110). A driver (108) for a given hardware device may refer to a special computer program that enables the operation or control of the given hardware device. More specifically, a driver (108) may serve as a translator between the instructing software (e.g., host device OS, file system (106), etc.) and the given hardware device, thereby facilitating the translation of the former's instructions into a language that the given hardware device can comprehend and act upon.

In one embodiment of the invention, the storage device (110) may relate to any portable, direct-attached storage (DAS) system. A DAS system may represent dedicated digital storage, which directly connects to a computing system—i.e., the host device (102)—rather than through a network. The storage device (110) may be implemented, for example, as an enclosure including one or many non-transitory computer readable media for retaining digital data in whole or in part, and temporarily and/or permanently. Should the storage device (110) include multiple non-transitory computer readable media (e.g., flash storage, optical storage, magnetic storage, solid-state storage, etc.), the media may be of a common type or of varying types. Furthermore, the storage device (110) may include a controller (112), volatile storage (114), a]nd one or more persistent storage media devices (116). Each of these storage device (110) subcomponents is described below.

In one embodiment of the invention, the controller (112) may represent an integrated circuit configured for processing instructions (e.g., computer readable program code). These instructions may include, but are not limited to, data reading and/or writing operations from the host device (102) directed to retrieving and/or storing information from/into the array of persistent storage media devices (116). Further, based on these instructions, the controller (112) may include functionality to interact with the volatile storage (114) and/or the array of persistent storage media devices (116) to perform the steps outlined in FIGS. 4 and 5, below. One of ordinary skill will appreciate that the controller (112) may perform other functionalities without departing from the scope of the invention. Examples of the controller (112) may include, but are not limited to, a micro-controller, a microprocessor, a field-programmable gate array (FPGA), a central processing unit (CPU), or any other instructions-processing integrated circuit.

In one embodiment of the invention, the volatile storage (114) may represent computer memory that requires power to maintain stored information. That is, volatile storage (114) may refer to storage technology capable of retaining information temporarily. Examples of volatile storage (114) may include, but are not limited to, static random access memory (SRAM) and dynamic random access memory (DRAM).

In one embodiment of the invention, the persistent storage media device(s) (116) may refer to a collection of non-volatile storage, or storage technologies that do not require a continuous supply of power to retain information. Accordingly, each persistent storage media device (116) may encompass non-transitory computer readable media on which digital information may be stored in whole or in part, and temporarily and/or permanently. Further, any subset or all of the persistent storage media device(s) (116) may or may not be combined in a redundant array of independent disks (RAID) configuration for fault tolerance purposes. Examples of persistent (i.e., non-volatile) storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the physical connection (118) between the host device (102) and the storage device (110) may represent any tangible cable, or an assembly of wires, configured for inter-device data transfer. Examples of the physical connection (118) may include, but are not limited to, a FireWire cable (which is based on IEEE 1394), a serial advanced technology attachment (SATA) (or any variant thereof) cable, a universal serial bus (USB) (or any variant thereof) cable, a small computer system interface (SCSI) (or any variant thereof) cable, a serial-attached SCSI (SAS) (or any variant thereof) cable, a Thunderbolt cable, or any other cabling solution for storage device (110) interfacing.

While FIG. 1 shows a configuration of components, other system (100) configurations may be used without departing from the scope of the invention.

Figure 2:
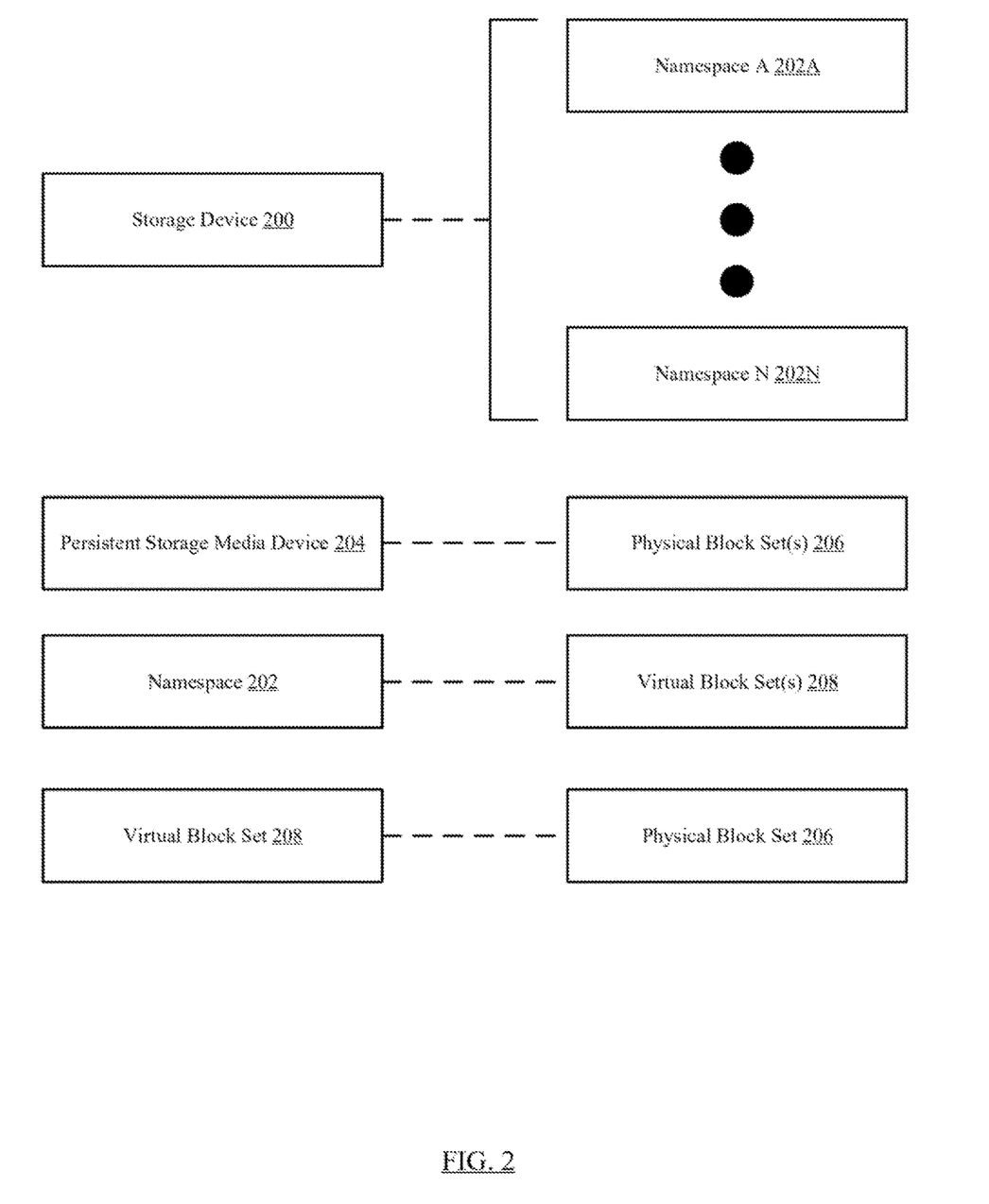
FIG. 2 shows various relationships in accordance with one or more embodiments of the invention.

FIG. 2 shows various relationships in accordance with one or more embodiments of the invention. These relationships may include mappings associating a storage device (200) to one or more namespaces (202A-202N), a persistent storage media device (204) to one or more physical block sets (206), a namespace (202) to one or more virtual block sets (208), and a virtual block set (208) to a physical block set (206). Each of these mappings is described below.

In one embodiment of the invention, a storage device (200) may retain digital data on one or many non-transitory computer readable media disposed therein, where the digital data may pertain to one or more namespaces (202, 202A-202N). A namespace (202, 202A-202N) may refer to an abstraction used to isolate a subset or partition of the pooled storage space, across the non-transitory computer readable media, which may be dedicated to a given user of a host device (not shown) (described above) (see e.g., FIG. 1), a given operating system (OS) installed on the host device, and/or a given file system implemented on the host device.

Further, in one embodiment of the invention, each namespace (202, 202A-202N) may define a hierarchical naming and organizational framework for managing data retained within the given subset of the pooled storage space with which the namespace (202, 202A-202N) may be associated. By way of an example, each namespace (202, 202A-202N) may define: (i) the character set (e.g., letters, numbers, symbols, etc.) and maximum length of characters used for data naming; (ii) the logical structure (e.g., directories, sub-directories, and filenames) used for data organization; and (iii) the metadata structure (e.g., disk block usage and availability, creation date, last modification date, disk block locations, disk subdivisions used, etc.) used for data description and support. Moreover, each namespace (202, 202A-202N) may be referenced using a unique namespace identifier.

In one embodiment of the invention, a persistent storage media device (204), of the storage device (200) (described above) (see e.g., FIG. 1), may represent a physical (i.e., hardware) disk for storing data. Further, the storage space on a physical disk may be subdivided into numerous physical blocks—each of which may function as a smallest unit of storage space configured to be addressed and accessed by the storage device controller. A group of these physical blocks, which may or may not be contiguous, across one or many physical disks, may be referred to as a physical block set (206).

In one embodiment of the invention, namespaces (202, 202A-202N), as described above, may isolate partitions of the pooled storage space, across the one or many persistent storage media device(s) (204), for dedicated use by given users, operating systems, and/or file systems. Each partition may be implemented as a virtual (i.e., logical) disk or volume for storing data respective to a given namespace (202, 202A-202N). Similar to a physical disk, a virtual disk may also be subdivided into numerous blocks—i.e., virtual blocks—each of which may function as a smallest unit of virtual storage space configured to be addressed and accessed by the namespace (202, 202A-202N) owner (e.g., user, OS, and/or file system). A contiguous group of these virtual blocks, within a given virtual disk (or partition), may be referred to as a virtual block set (208).

In one embodiment of the invention, virtual blocks of a virtual disk (i.e., pooled storage space partition) may correspond to physical blocks of one or more physical disks (i.e., one or more persistent storage media devices (204)). By the same token, a given virtual block set (208), within a given virtual disk, may map to a given physical block set (206). The individual physical blocks of the given physical block set (206) may reside across any subset of the physical disks of the storage device (200)—that is, the given physical block set (206) may reside entirely as non-contiguous physical blocks on a single physical disk, or partially as non-contiguous physical blocks on each of multiple physical disks.

Figure 3:
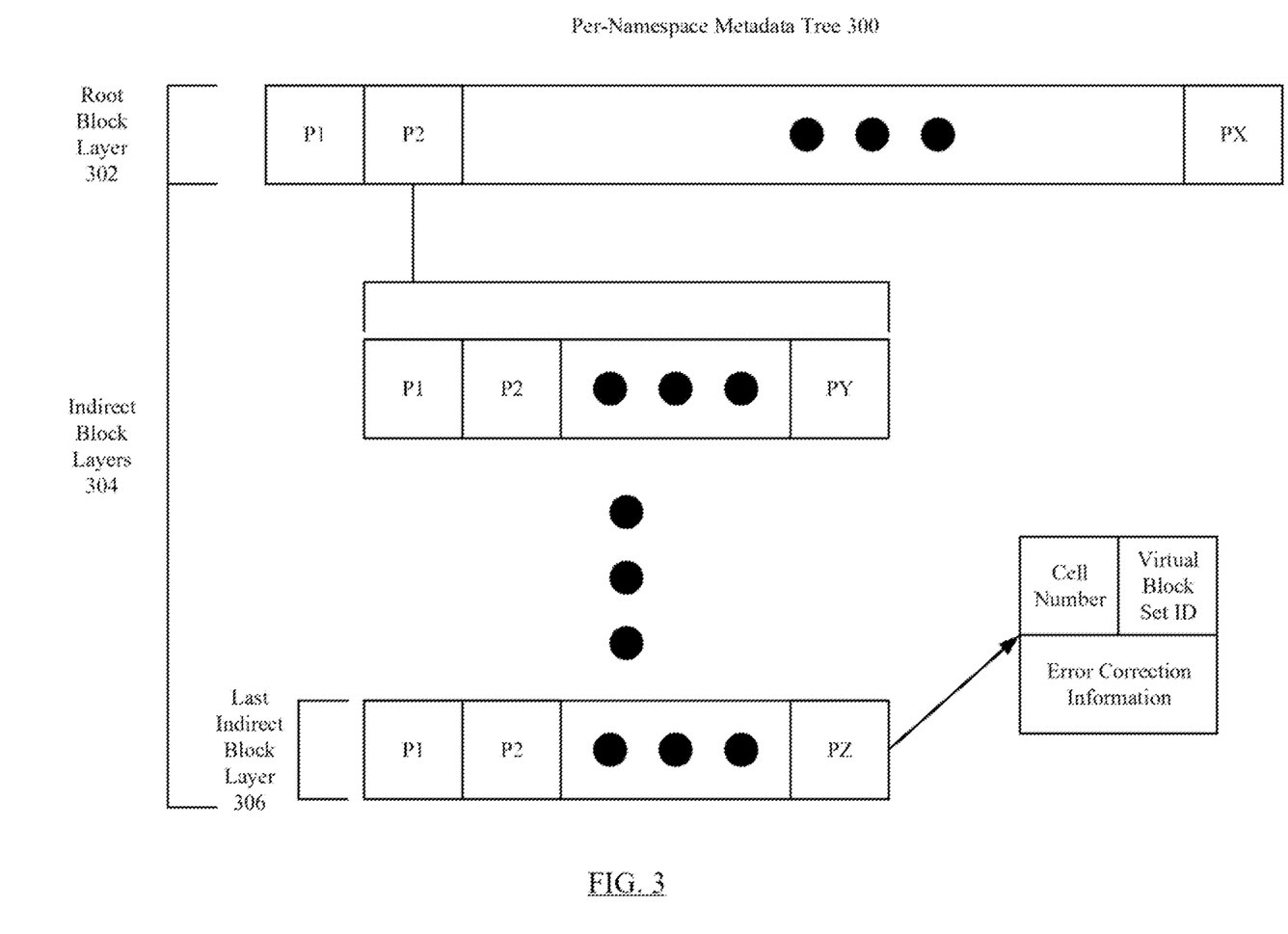
FIG. 3 shows a per-namespace metadata tree in accordance with one or more embodiments of the invention.

FIG. 3 shows a per-namespace metadata tree in accordance with one or more embodiments of the invention. The per-namespace metadata tree (300) may represent a hierarchical data structure, maintained by a storage device controller (described above) (see e.g., FIG. 1), for tracking metadata pertinent to physical blocks of the persistent storage media device(s) within the storage device. The per-namespace metadata tree (300) may include a root block layer (302) and one or more indirect block layers (304)—the latter of which may include at least a last indirect block layer (306). Each of these per-namespace metadata tree (300) subcomponents is described below.

In one embodiment of the invention, each block layer (302, 304, 306) may be represented through an array of block pointers. A block pointer may represent a data object (e.g., variable) that stores the memory address of, and accordingly points to, or references, either one or more other block pointers or namespace metadata. More precisely, block pointers of the root block layer (302) and the indirect block layer(s) (304) (with the exception of the last indirect block layer (306)) may each store the memory address(es) to one or more block pointers residing in a block layer immediately below their respective block layers. For example, any block pointer [P1, P2, . . . , PX] of the root block layer (302) may reference one or more block pointers [P1, P2, . . . , PY] of the first indirect block layer; any of these block pointers [P1, P2, . . . , PY] may subsequently reference one or more block pointers of a second indirect block layer (not shown) (if any) or one or more block pointers [P1, P2, . . . , PZ] of the last indirect block layer (306) should no other indirect block layers are interposed between the first indirect block layer and the last indirect block layer (306); and so forth. Meanwhile, block pointers of the last indirect block layer (306) may each store the memory address to memory storage space maintaining namespace metadata (described below) for a given physical block, retaining data or parity information thereof, in persistent storage.

In one embodiment of the invention, each block pointer [P1, P2, . . . , PX] of the root block layer (302) may be representative of a root node for a given metadata subtree associated with a given namespace (described above) (see e.g., FIG. 2). Accordingly, each block pointer [P1, P2, . . . , PX] of the root block layer (302) may map to a unique namespace identifier assigned to the respective namespace with which the metadata subtree, stemming from the block pointer [P1, P2, . . . , PX] of the root block layer (302), may be associated. A metadata subtree may represent a subset of the per-namespace metadata tree (300), which maintains namespace metadata, for physical blocks in persistent storage, pertinent to an associated namespace. The number of indirect block layers (304) and, accordingly, the number of block pointers, forming a metadata subtree, may depend on the persistent storage space (i.e., physical blocks) consumed by data associated with their associated namespace.

In one embodiment of the invention, the namespace metadata, referenced by a given block pointer [P1, P2, . . . , PZ] of the last indirect block layer (306), which may describe a given physical block in persistent storage, may include, but is not limited to: (a) a cell number specifying a cell location for the given physical block amongst a group of physical blocks forming a given physical block set; (b) a virtual block set identifier uniquely assigned to a given virtual block set mapped to a given namespace (see e.g., FIG. 2), where the given virtual block set also maps to the aforementioned given physical block set; and (c) error correction information (e.g., a checksum value) calculated for data retained in the given physical block.

Figure 4:
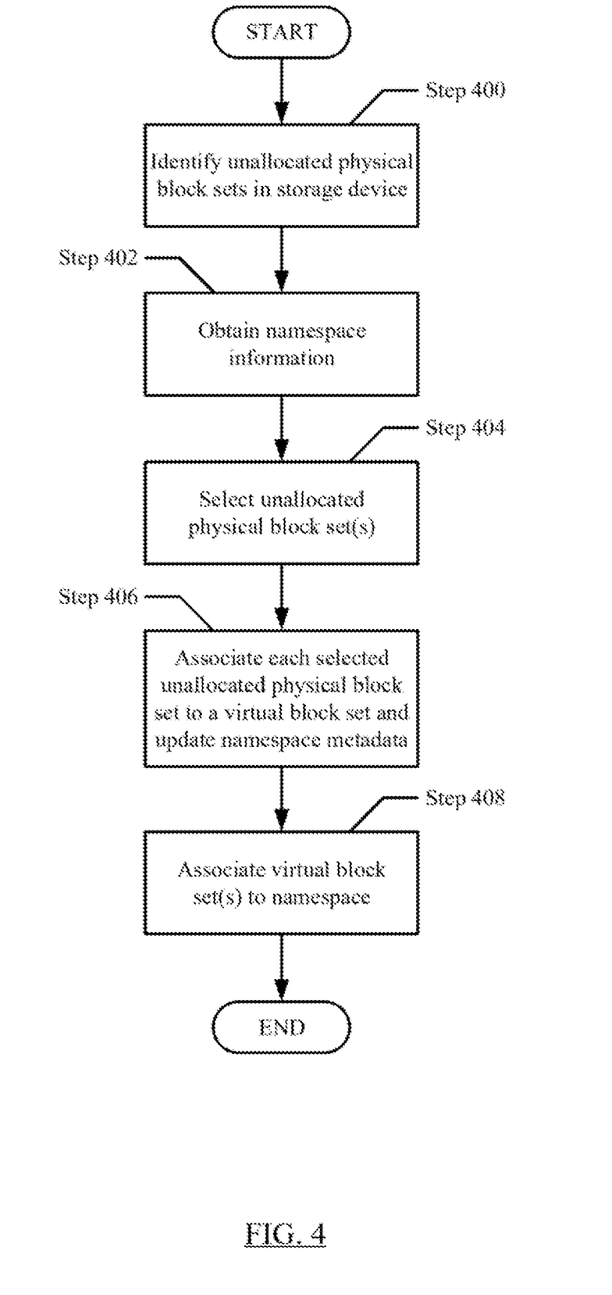
FIG. 4 shows a flowchart describing a method for associating physical and virtual block sets in accordance with one or more embodiments of the invention.

FIG. 4 shows a flowchart describing a method for associating physical and virtual block sets in accordance with one or more embodiments of the invention. The various steps outlined below may be performed by the controller of the storage device (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a set of unallocated physical block sets, residing across persistent storage on the storage device, is identified. In one embodiment of the invention, each unallocated physical block set may refer to a non-contiguous group of unallocated physical blocks, where an unallocated physical block may represent a physical block unoccupied by live data. Live data, in turn, may refer to any granularity of digital data forming one or more active data files in whole or in part.

In Step 402, namespace information is obtained. In one embodiment of the invention, a namespace may refer to an abstraction used to isolate a subset or partition of pooled persistent storage space, which may be dedicated to a given user of a host device (described above) (see e.g., FIG. 1), a given operating system (OS) installed on the host device, and/or a given file system implemented on the host device. Further, the obtained namespace information may include, but is not limited to: a unique namespace identifier assigned to the namespace and/or any other attributes associated with the namespace, e.g., creation time, etc.

In Step 404, from the set of unallocated physical block sets (identified in Step 400), a subset of unallocated physical block sets is selected. In Step 406, each unallocated physical block set (selected in Step 404) is mapped to a respective virtual block set. Further, namespace metadata describing and pertaining to each unallocated physical block, of the selected unallocated physical block set(s), is updated. Specifically, in one embodiment of the invention, a virtual block set identifier uniquely assigned to the respective virtual block set to which a given unallocated physical block is mapped, may be used to update the namespace metadata associated with the given unallocated physical block.

In Step 408, the virtual block set(s) (mapped, in Step 406, to the unallocated physical block set(s) (selected in Step 404)) is/are associated with the namespace (of which namespace information had been obtained in Step 402).

Figure 5:
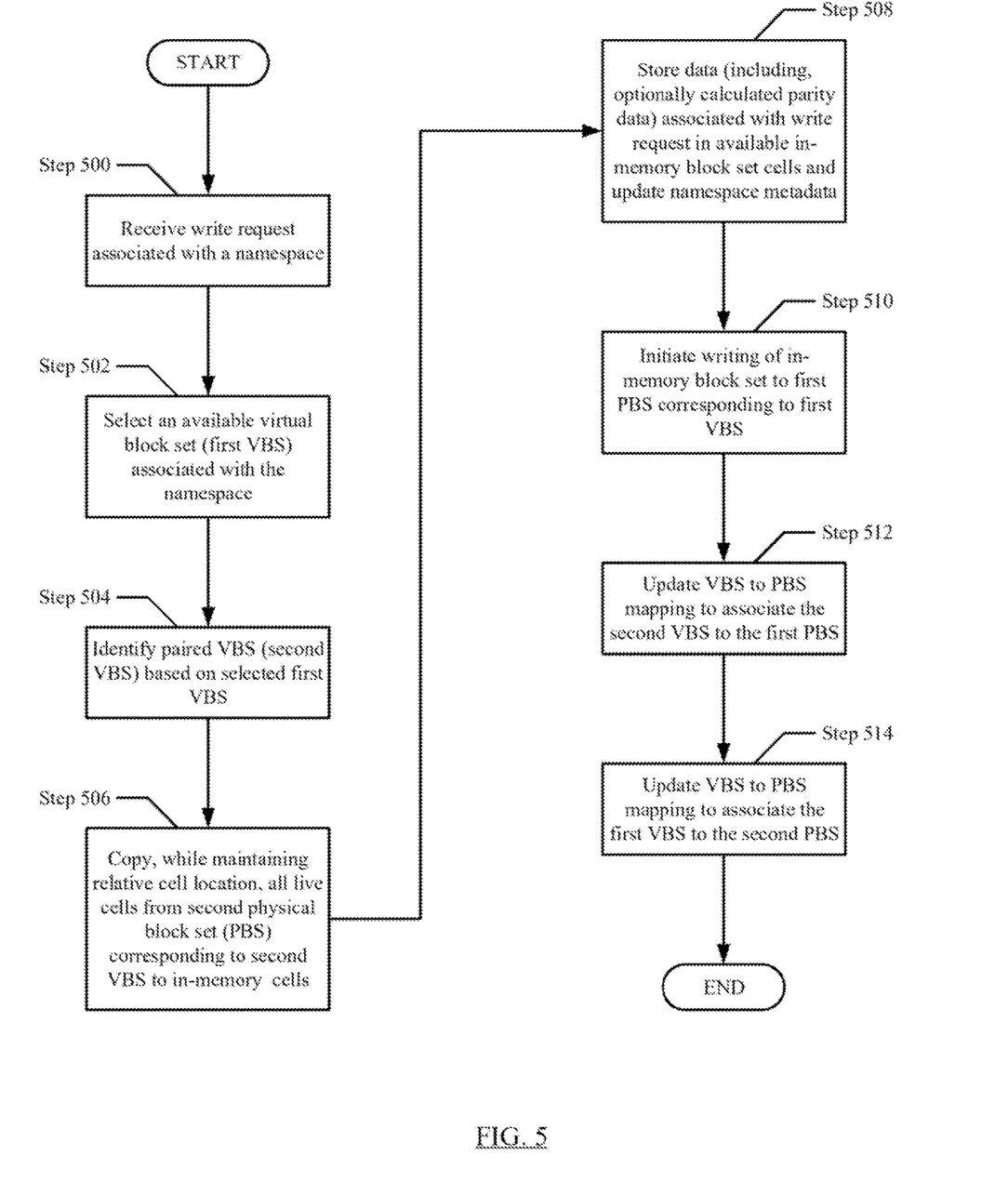
FIG. 5 shows a flowchart describing a method for processing write requests in accordance with one or more embodiments of the invention.

FIG. 5 shows a flowchart describing a method for processing write requests in accordance with one or more embodiments of the invention. The various steps outlined below may be performed by the controller of the storage device (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a write request is received from a host device (described above) (see e.g., FIG. 1). In one embodiment of the invention, the write request may include write-data, or any granularity of digital data requested to be written into persistent storage on the storage device, as well as a unique namespace identifier assigned to a given namespace.

In Step 502, a first virtual block set is selected. In one embodiment of the invention, the first virtual block set may represent a group of contiguous virtual blocks—each of which maps to a respective physical block, in the persistent storage of the storage device, which may be available, or otherwise unoccupied by live data. Further, the first virtual block set may be associated with the above-mentioned given namespace (of which a unique namespace identifier had been obtained via the write request (received in Step 500)).

In Step 504, a second virtual block set is identified. In one embodiment of the invention, the second virtual block set may represent a group of contiguous virtual blocks—of which at least one maps to a respective physical block, in the persistent storage of the storage device, which may be occupied by live data. Further, the second virtual block set may have been pre-paired to the first virtual block set (selected in Step 502).

In Step 506, all live cells, from a second physical block set, are copied to an in-memory block set. In one embodiment of the invention, the second physical block set may represent a group of non-contiguous physical blocks—of which at least one may be occupied by live data. Accordingly, a physical block occupied by live data may be referred to as a live cell. Further, the second physical block set may map to the second virtual block set (identified in Step 504). Moreover, in copying the live cell(s) of the second physical block set to the in-memory block set, the relative cell location(s) of the live cell(s) is/are maintained. The in-memory block set may represent a group of contiguous or non-contiguous memory blocks, which may reside in the volatile storage of the storage device.

In Step 508, the write-data (obtained via the write request received in Step 500) is stored across one or more unallocated memory blocks of the above-mentioned in-memory block set. Further, in one embodiment of the invention, calculated parity information, associated with the write-data, may also be stored across one or more other unallocated memory blocks of the in-memory block set. Parity information may refer to one or more bit values (e.g., ones or zeroes)

that may be used to reconstruct the corresponding data in the event reconstruction is required.

Thereafter, in one embodiment of the invention, namespace metadata associated with the given namespace (of which a unique namespace identifier had been obtained via the write request (received in Step 500)) is updated. Updating of the namespace metadata may entail traversing block pointers of a per-namespace metadata tree (described above) (see e.g., FIG. 3) using the aforementioned unique namespace identifier. In traversing the per-namespace metadata tree, maintained metadata, pertinent to the physical blocks of the physical block set(s) mapped to the virtual block set(s) associated with the given namespace, is identified. The identified metadata (i.e., cell number, virtual block set identifier, and/or error correction information) may subsequently be updated.

In one embodiment of the invention, Step 508 results in the in-memory block set being completely populated with live data and/or write-data. In another embodiment of the invention there may be scenarios in which there is insufficient write-data and live data to completely populate the in-memory block set (e.g., because all, or substantially all, of the data in the second physical block set is not live data and there is insufficient write-data being received from the host device). In this scenario, the controller may wait a certain period of time for the in-memory block set to be completely populated; however, if the time period elapses and the in-memory block set is not completely populated, then the remaining unpopulated blocks in the in-memory block set are filled with null values (or another pre-determined value) in order to completely populate the in-memory block set. In the latter embodiment, null values are used in order to not impact the overall performance of the controlling writing data to the persistent storage media devices.

In Step 510, writing of the in-memory block set, populated with both live cell data from the second physical block set (copied over in Step 506) and the write-data as well as the parity information (stored therein in Step 508), is initiated. Specifically, in one embodiment of the invention, while maintaining their relative cell locations, data stored in each in-memory block of the in-memory block set may be written into a respective physical block of a first physical block set. The first physical block set may represent a group of non-contiguous physical blocks—each of which, prior to the aforementioned write operation, had been available or unoccupied by existing live data. Furthermore, the first physical block set may map to the first virtual block set (selected in Step 502).

In Step 512, associations between virtual and physical block sets are updated. Specifically, in one embodiment of the invention, the second virtual block set (identified in Step 504), initially mapped to the second physical block set (from which live cells had been copied into the in-memory block set in Step 506), may be re-mapped to the first physical block set (into which data stored in the in-memory block set had been written in Step 510). Subsequently, in Step 514, the first virtual block set (selected in Step 502), initially mapped to the first physical block set, is re-mapped to the second physical block set.

FIGS. 6A-6E show an exemplary scenario in accordance with one or more embodiments of the invention. The following exemplary scenario, presented in conjunction with components shown in FIGS. 6A-6E, is for explanatory purposes only and not intended to limit the scope of the invention.

For the exemplary scenario, consider that a write request has been received by a storage device (see e.g., FIG. 1) and from a host device physically connected thereto. The write request specifies some granularity of write-data, or data desired to be written to persistent storage on the storage device, and a unique namespace identifier assigned to a given namespace with which the write-data is associated. Following embodiments of the invention, processing of the write request begins with the selection or identification of various block sets mapped to the given namespace.

Figure 6A:
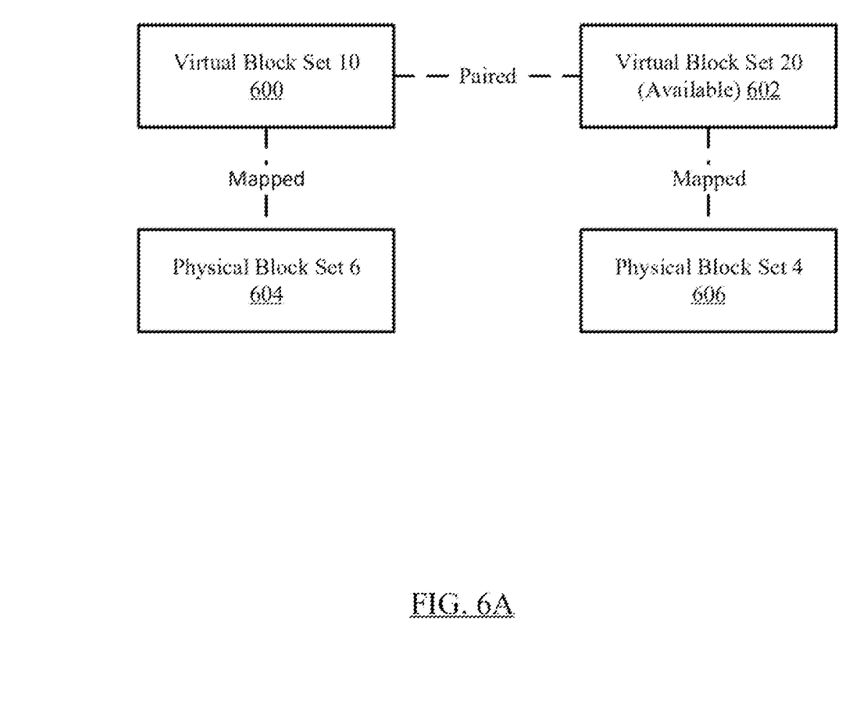
FIGS. 6A-6E show an exemplary scenario in accordance with one or more embodiments of the invention.

Turning to FIG. 6A, these above-mentioned various block sets, associated with the given namespace, and their relationships are shown. Of the various block sets and relationships there-between, there are: a virtual block set 10 (600) paired to a virtual block set 20 (602); a physical block set 6 (604) mapped to the virtual block set 10 (600); and a physical block set 4 (606) mapped to the virtual block set 20 (602). Virtual block set 10 (600) may represent a group of contiguous virtual blocks—of which at least one maps to a respective physical block, of physical block set 6 (604), which is currently occupied by live data. Meanwhile, virtual block set 20 (602) may represent a group of contiguous virtual blocks—each of which maps to a respective physical block, of physical block set 4 (606), which may be available or unoccupied by live data.

Figure 6B:
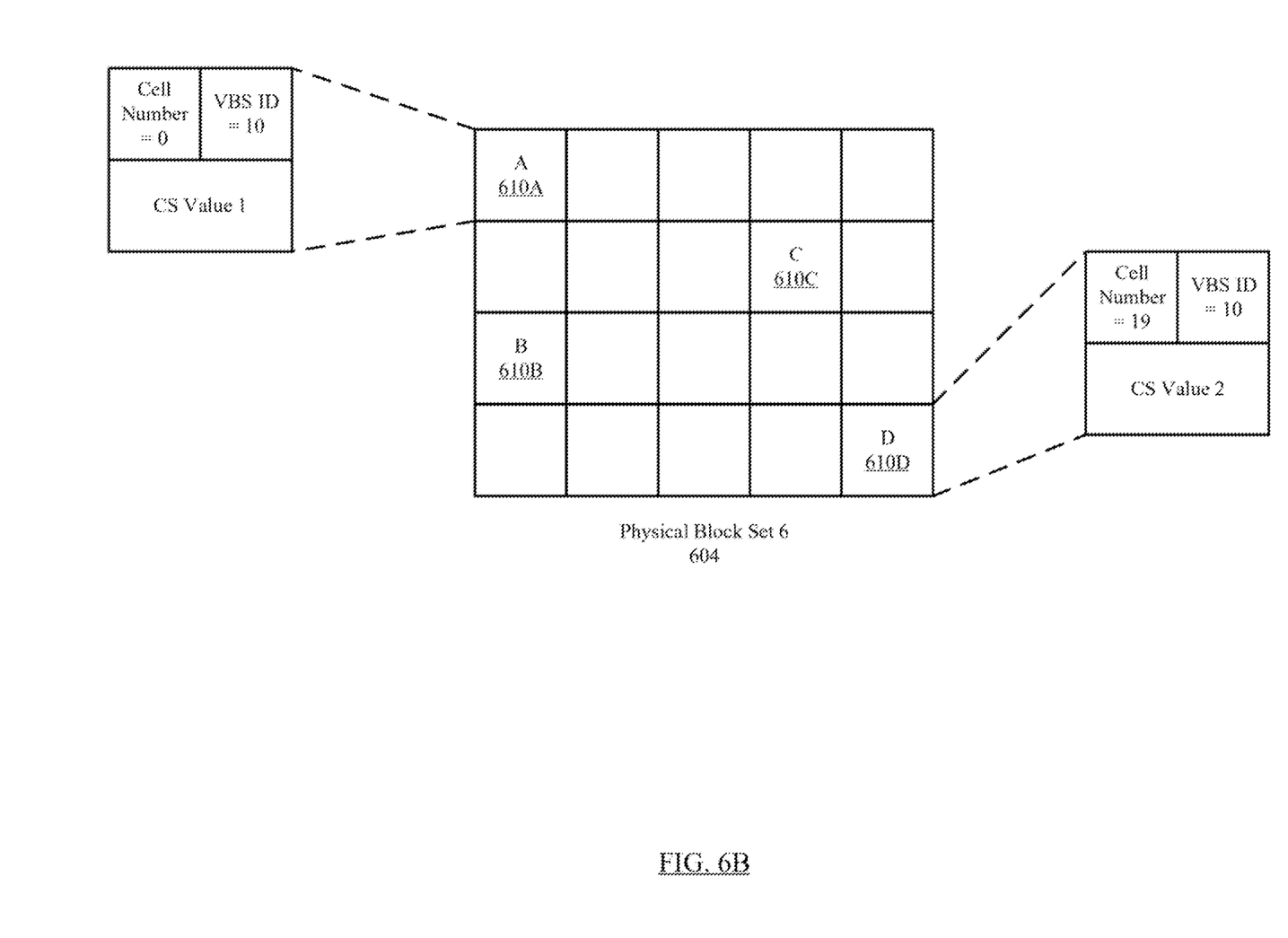

Turning to FIG. 6B, a current state of physical block set 6 (604) is illustrated. Physical blocks A (610A), B (610B), C (610C), and D (610D) are representative of the live cells, or physical blocks containing live data, of physical block set 6 (604). Namespace metadata is maintained, via the per-namespace metadata tree (see e.g., FIG. 3), for each physical block of physical block set 6 (604), as well as other physical block sets—e.g., physical block set 4 (606)—associated with the given namespace (as well as other physical block sets associated with other namespaces). The maintained namespace metadata, for a given physical block, includes: a cell number referencing a cell location of the given physical block within a given physical block set; a virtual block set identifier uniquely assigned to a given virtual block set mapped to the given physical block set; and error correction information for the data (if any) stored in the given physical block, which may be implemented through a checksum value.

By way of examples, maintained namespace metadata for physical blocks A (610A) and D (610D) are disclosed. Specifically, namespace metadata for the former specifies that physical block A (610A) resides in a first cell location (indexed by cell number 0), whereas namespace metadata for the latter specifies that physical block D (610A) resides in a last cell location (indexed by cell number 19), of the 20 physical blocks forming physical block set 6 (604). Further, namespace metadata for both physical blocks A (610A) and D (610D) indicate that they are each mapped to virtual block set 10 (600), as is physical block set 6 (604) (see e.g., FIG. 6A). Lastly, because different data may be stored in physical blocks A (610A) and D (610D), their respective namespace metadata includes varying checksum values representative of error correction information for the different data.

Figure 6C:
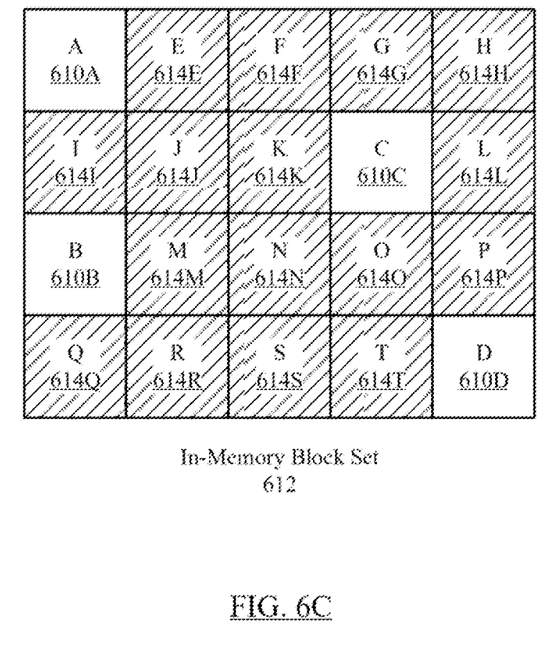

Turning to FIG. 6C, following embodiments of the invention, live cells from physical block 6 (604) (see e.g., FIG. 6B) are copied into an in-memory block set (612) within volatile storage of the storage device. The relative cell locations of these live cells—i.e., physical blocks A (610A), B (610B), C (610C), and D (610D)—are maintained. Thereafter, the write-data, and parity information, are stored in the remaining, unallocated memory blocks—i.e., blocks E through T (614E-614T)—of the in-memory block set (612).

Once the in-memory block set (612) is populated completely, writing of the data stored therein, to persistent storage, initiates.

Figure 6D:
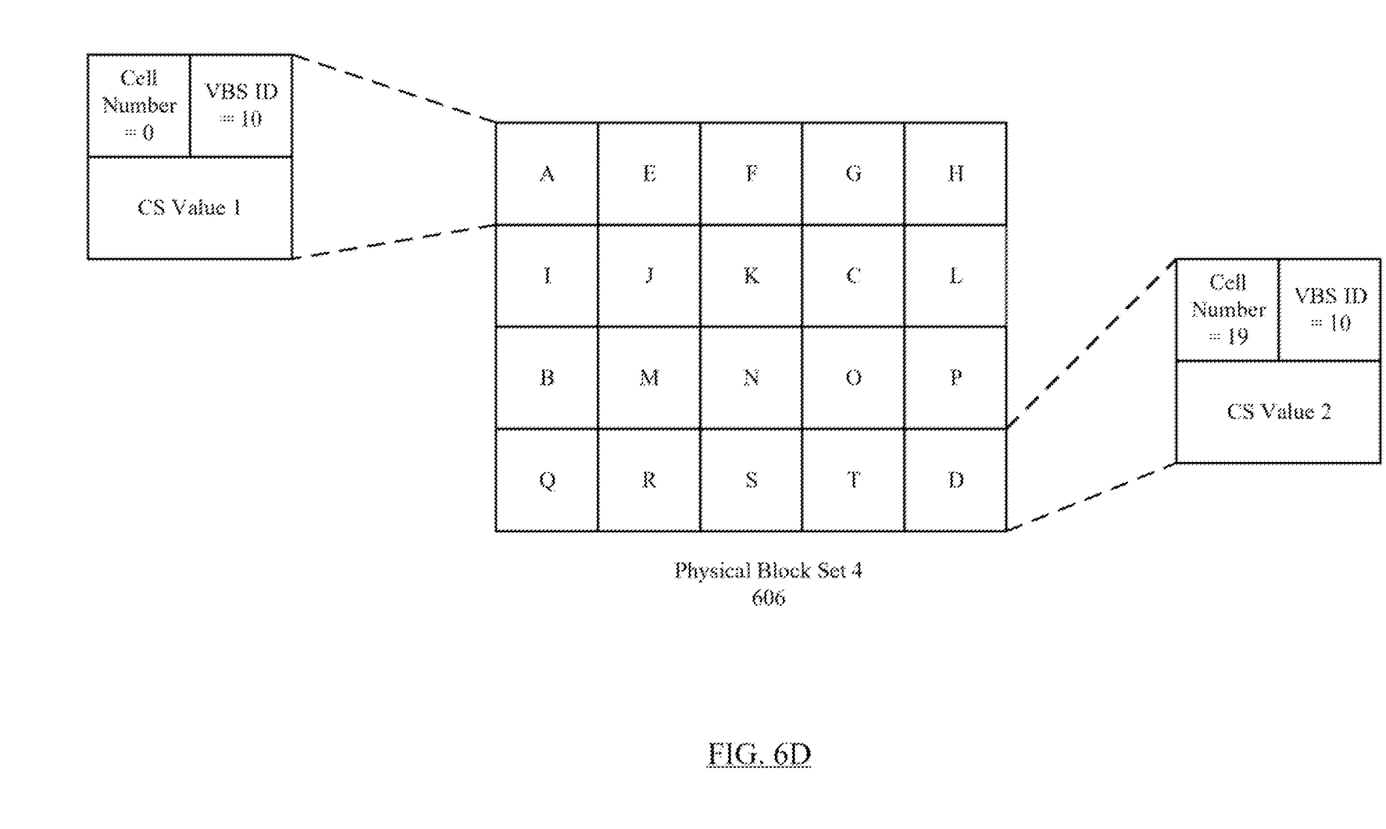

Turning to FIG. 6D, a current state of physical block set 4 (606) is shown following the completion of the above-mentioned initiated write operation. The relative cell locations of the data, from the in-memory block set (612) (see e.g., FIG. 6C) to physical block set 4 (606), are maintained. Further, the namespace metadata—at least for the copied live cells—remain unchanged, whereas namespace metadata pertinent to the other physical blocks, wherein the write-data and parity information are retained, is populated based on the current cell location (indexed by a cell number) of their respective physical block, the checksum value calculated using the data stored in their respective physical block, and a unique virtual block set identifier mapping physical block set 4 (606) to virtual block set 10 (600).

Figure 6E:
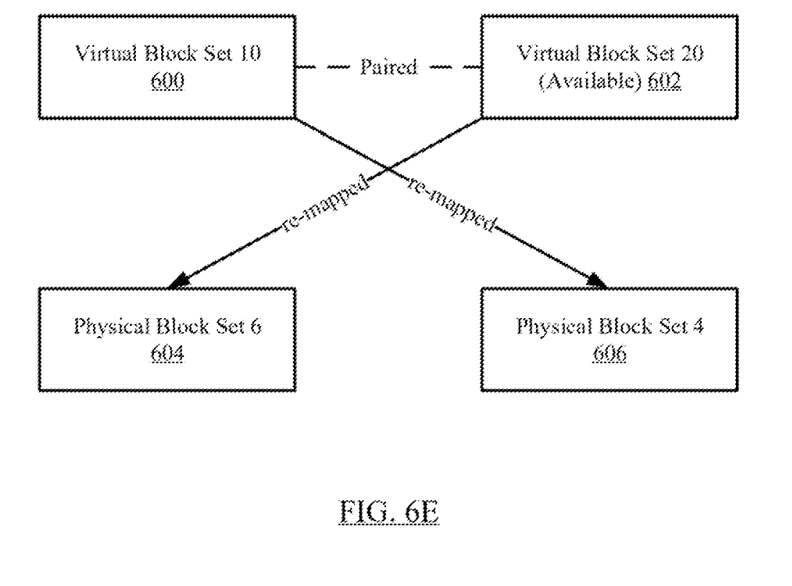

From here, associations between the various block sets are updated. Turning to FIG. 6E, the updated relationships between the virtual and physical block sets are shown. Specifically, the updated relationships include: a re-mapping of virtual block set 10 (600) to physical block set 4 (606) (see e.g., FIG. 6D), where the former had originally been mapped to physical block set 6 (604) (see e.g., FIG. 6A); and a re-mapping of virtual block set 20 (602) to physical block set 6 (604), where the former had originally been mapped to physical block set 4 (606).

Figure 7:
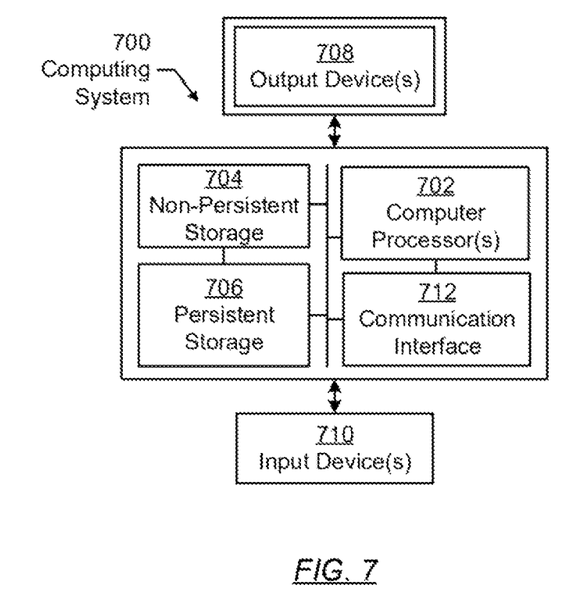
FIG. 7 shows an exemplary computing system in accordance with one or more embodiments of the invention.

FIG. 7 shows an exemplary computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a central processing unit (CPU) and/or a graphics processing unit (GPU). The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for writing data in response to a write request, the method comprising:
   receiving a write request comprising write-data associated with a namespace;
   selecting a first virtual block set (VBS) associated with the namespace, wherein the first VBS comprises a plurality of first VBS cells, wherein the first VBS is mapped to a first physical block set (PBS), wherein each physical block cell of the first PBS is unallocated;
   identifying a second VBS comprising a plurality of second VBS cells, wherein the second VBS is mapped to a second PBS, wherein at least one physical block cell of the second PBS is occupied by live data, and wherein at least one additional physical block cell of the second PBS is unallocated;
   pairing the second VBS with the first VBS;
   copying, into an in-memory block set, the live data occupying the at least one physical block cell of the second PBS;
   storing the write-data across a remainder of cells of the in-memory block set, wherein the remainder of cells are unallocated cells;
   writing the in-memory block set to the second PBS.

2. The method of claim 1, wherein the write request further comprises a namespace identifier assigned to the namespace.

3. The method of claim 1, wherein copying the live data comprises maintaining a relative cell location of the live data from the second PBS to the in-memory block set.

4. The method of claim 1, wherein storing the write-data further comprises storing parity information across the unallocated cells of the in-memory block set.

5. The method of claim 1, further comprising:
   prior to writing the in-memory block set to the second PBS:
      updating namespace metadata maintained for physical blocks mapped to the namespace.

6. The method of claim 5, wherein updating the namespace metadata comprises:
   traversing a per-namespace metadata tree using a namespace identifier assigned to the namespace to identify the namespace metadata; and
   modifying the namespace metadata to reflect at least one selected from a group consisting of an updated cell number, an updated virtual block set identifier, and updated error correction information.

7. The method of claim 1, further comprising:
re-mapping the first VBS from the first PBS to the second PBS; and
re-mapping the second VBS from the second PBS to the first PBS.

8. The method of claim 1, further comprising:
prior to receiving the write request:
identifying a plurality of unallocated PBSs in persistent storage;
selecting the first PBS and the second PBS from the plurality of unallocated PBSs;
mapping the first PBS to the first VBS and the second PBS to the second VBS;
updating namespace metadata associated with the namespace; and
mapping the first VBS and the second VBS to the namespace.

9. A non-transitory computer readable medium (CRM) comprising computer readable program code, which when executed by a computer processor, enables the computer processor to:
receive, associated with a namespace, a write request comprising write-data;
select a first virtual block set (VBS) associated with the namespace, wherein the first VBS comprises a plurality of first virtual block cells, wherein the first VBS is mapped to a first physical block set (PBS), wherein each physical block cell of the first PBS is unallocated;
identify a second VBS comprising a plurality of second VBS cells, wherein the second VBS is mapped to a second PBS, wherein at least one physical block cell of the second PBS is occupied by live data, and wherein at least one additional physical block cell of the second PBS is unallocated;
copy, into an in-memory block set, the live data occupying the at least one physical block cell of the second PBS;
store the write-data across a remainder of cells of the in-memory block set, wherein the remainder of cells are unallocated cells;
write the in-memory block set to the second PBS.

10. The non-transitory CRM of claim 9, wherein the write request further comprises a namespace identifier assigned to the namespace.

11. The non-transitory CRM of claim 9, wherein copying the live data comprises maintaining a relative cell location of the live data from the second PBS to the in-memory block set.

12. The non-transitory CRM of claim 9, wherein storing the write-data further comprises storing parity information across the unallocated cells of the in-memory block set.

13. The non-transitory CRM of claim 9, comprising computer readable program code, which when executed by the computer processor, further enables the computer processor to:
prior to writing the in-memory block set to the second PBS:
update namespace metadata maintained for physical blocks mapped to the namespace.

14. The non-transitory CRM of claim 13, comprising computer readable program code to update the namespace metadata, which when executed by the computer processor, enables the computer processor to:
traverse a per-namespace metadata tree using a namespace identifier assigned to the namespace to identify the namespace metadata; and
modify the namespace metadata to reflect at least one selected from a group consisting of an updated cell number, an updated virtual block set identifier, and updated error correction information.

15. The non-transitory CRM of claim 9, comprising computer readable program code, which when executed by the computer processor, further enables the computer processor to:
re-map the first VBS from the first PBS to the second PBS; and
re-map the second VBS from the second PBS to the first PBS.

16. The non-transitory CRM of claim 9, comprising computer readable program code, which when executed by the computer processor, further enables the computer processor to:
prior to receiving the write request:
identify a plurality of unallocated PBSs in persistent storage;
select the first PBS and the second PBS from the plurality of unallocated PBSs;
map the first PBS to the first VBS and the second PBS to the second VBS;
update namespace metadata associated with the namespace; and
map the first VBS and the second VBS to the namespace.

17. A portable storage device, comprising:
volatile storage and persistent storage; and
a controller operatively connected to the volatile storage and the persistent storage, and programmed to:
receive, associated with a namespace, a write request comprising write-data;
select a first virtual block set (VBS) associated with the namespace, wherein the first VBS comprises a plurality of first virtual block cells, wherein the first VBS is mapped to a first physical block set (PBS), wherein each physical block cell of the first PBS is unallocated;
identify a second VBS comprising a plurality of second VBS cells, wherein the second VBS is mapped to a second PBS, wherein at least one physical block cell of the second PBS is occupied by live data, and wherein at least one additional physical block cell of the second PBS is unallocated;
copy, into an in-memory block set of the volatile storage, the live data occupying the at least one physical block cell of the second PBS;
store the write-data across a remainder of cells of the in-memory block set, wherein the remainder of cells are unallocated cells;
write the in-memory block set to the second PBS.

18. The portable storage device of claim 17, wherein, to update the virtual block set and physical block set associations, the controller is further programmed to:
re-map the first VBS from the first PBS to the second PBS; and
re-map the second VBS from the second PBS to the first PBS.

19. The portable storage device of claim 17, further comprising:
a host device operatively connected to the portable storage device, wherein the write request is received from the host device.

20. The portable storage device of claim 17, wherein the portable storage device is a directly-attached storage (DAS) system.

\* \* \* \* \*